Jan. 17, 1961     E. V. HARPER     2,968,713
WELD ASSEMBLY
Original Filed March 12, 1954     2 Sheets-Sheet 1
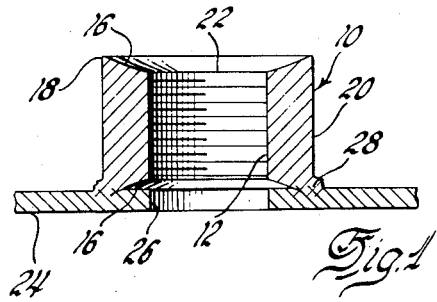
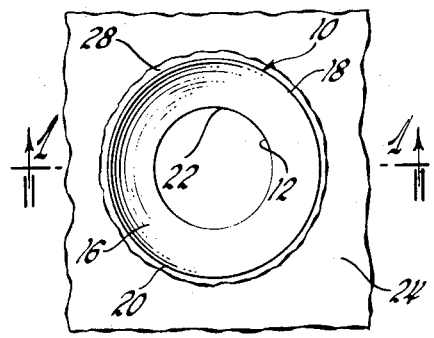
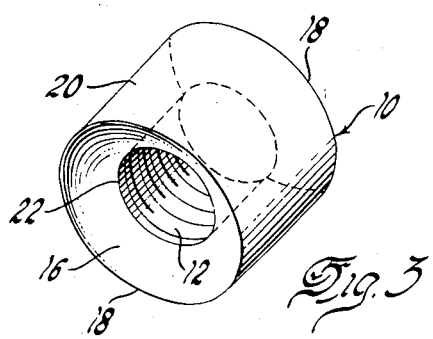
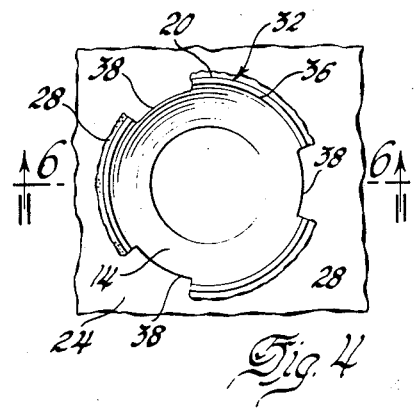
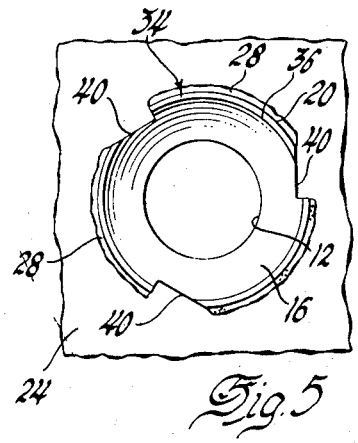
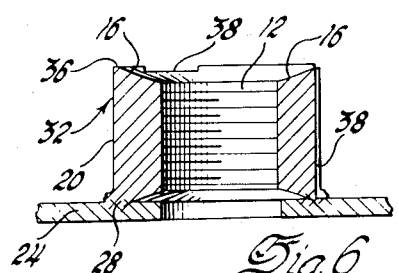
INVENTOR
*Ernest V. Harper*
BY *L. D. Burch*

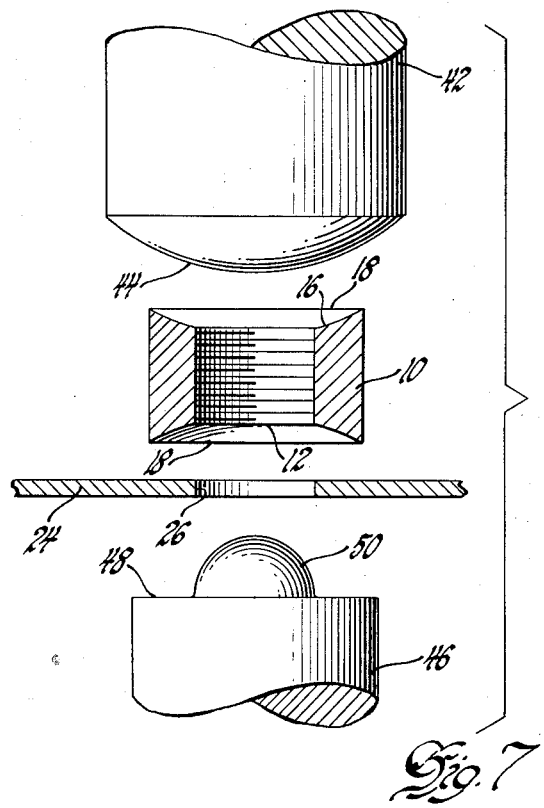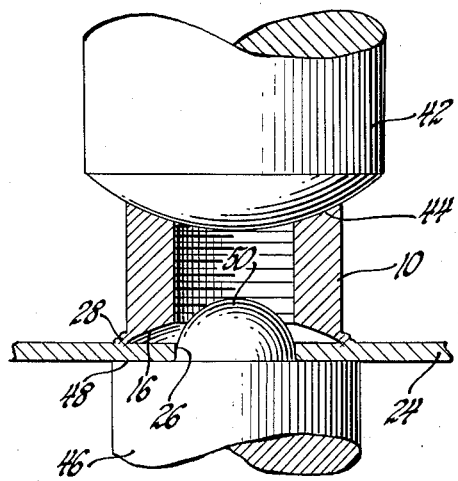

United States Patent Office 2,968,713
Patented Jan. 17, 1961

2,968,713
WELD ASSEMBLY

Ernest V. Harper, Utica, Mich., assignor to General Motors Corporation, Detroit, Mich., a corporation of Delaware Continuation of application Ser. No. 415,925, Mar. 12, 1954. This application Oct. 20, 1958, Ser. No. 768,438

6 Claims. (Cl. 219—93)

This invention is a continuation of the copending application, Serial No. 415,925, filed on March 12, 1954, and in the name of Ernest V. Harper.

This invention relates to weld assemblies, and more particularly to a nut adapted to be projection welded to a supporting structure and an electrode for applying the nut to the supporting structure.

A well known type of fastener is the weld nut having welding projections thereon by which it may be secured to an object in a position to subsequently receive a threaded fastener, such as a bolt. This type of nut is especially useful where it is difficult or impossible to hold the nut in place in any other manner, such as in blind hole applications.

Though many forms of weld nuts have been devised and successfully used, present forms of these nuts are still inadequate for certain automatic high production applications. For instance, most such nuts are square or otherwise polygonal in plan cross-section, which is wasteful of material although sometimes necessary in order to hold the nut while boring the nut and tapping the threads. Furthermore, these nuts are usually applied by specially-designed-automatic welding machines, which are normally equipped with a hopper, a pick-up mechanism in the hopper, an automatic rejection mechanism associated with the pick-up mechanism, a precisely made chute to transfer the nut from the hopper to the point of application of the nut, and a nut alignment mechanism at the point of application of the nut.

Automatic rejection is required because present day nuts usually have welding projections on one side only; thus, they cannot be permitted to enter the chute up-side-down. Since these nuts usually have corners thereon, they sometimes rotate in the chute and become stuck. When this happens, all the nuts behind that point are blocked. This requires a precision made chute and the attention of an operator to remove the obstacle when the block occurs. Due to space limitations, the nut must often by aligned in a certain manner on the object. This requires additional complicated equipment at a location where space is already critical.

A further difficulty frequently encountered is the misalignment of the opposite faces of the weld nut, due to inaccurate manufacturing procedures. The usual flat portions of the electrode surface contacting the weld nut will tend to cock the nut such that a gap exists between the nut and the supporting surface. This condition causes arcing and an uneven welding current.

Because of the general flat surfaced electrode, the weld nut is often poorly welded to the supporting surface if the nut is slightly out of axial alignment with respect to the electrode. Improper contact between the electrode and the nut caused thereby will not allow the proper welding potential to pass resulting in an unacceptable joint.

It is now proposed to provide a weld nut of simple inexpensive design which will eliminate the above objections. Since the nut is round, it therefore has no corners and it cannot become stuck in the chute. This permits of a simpler chute construction and simpler alignment means. The proposed nut has projection weld surfaces on both ends thereof, making the nut reversible so that simpler hopper and pick-up means may be provided and so that the rejection means may be eliminated entirely. Means may be provided on the nut to permit the holding of the nut while the threads are being tapped without losing the desirable properties of a round nut. The above means also enables the projection weld area to be varied to suit particular operating conditions. The proposed weld nut is further provided with spherically surfaced concave ends, the concavities extending from the outer peripheral edges which define the weld projections.

Correspondingly, it is proposed to provide the end of the welding electrode coming in contact with the weld nut, with a complementary, or spherically convex, surface. With this configuration, maximum contact is provided between the electrode and the nut regardless of the relative positions between the electrode and the nut. That is, if the surfaces of the nut are not exactly parallel, the electrode will not tip the nut when it comes in contact therewith, with the resulting unacceptable weld. Further, if the nut is not exactly axially aligned with the electrode, the mating surfaces will tend to cause the nut to slide along the supporting surface and into alignment.

Thus, a means is provided for assuring an acceptable welding operation with ease and accuracy, eliminating the many problems encountered in present day production installations.

In the drawings:

Figure 1 is a cross-sectional view illustrating a weld nut secured to a support and embodying the invention. Figure 1 is taken along the plane of line 1—1 of Figure 2 and looking in the direction of the arrows.

Figure 2 is a plan view of the assembly shown in cross-section by Figure 1.

Figure 3 is a perspective view of the weld nut shown by Figures 1 and 2.

Figure 4 is a top plan view of a modified form of weld nut embodying the invention and projection welded to a support.

Figure 5 is a top plan view of still another modified form of weld nut embodying the invention and projection welded to a support.

Figure 6 is a cross-sectional view taken along the plane of line 6—6 of Figure 4 and looking in the direction of the arrows.

Figure 7 is a cross sectional view of one modification of the weld nut and the associated supporting plate and welding electrodes.

Figure 8 is a sectional view of the assembly of Figure 7 showing the parts in the welding position.

Referring to the drawings in more detail, and particularly to Figures 1-3, a nut 10 having a threaded axial bore 12 may be made from suitable round stock. The opposite ends of the nut 10 may be formed to provide continuous spherical surfaces 16 extending from the outer peripheral edges 18 constituting the end portions of outer peripheral wall 20 to the inner peripheral edges 22 constituting the ends of axial bore 12.

Figures 7 and 8 show the welding electrode which may be used in welding the nut 10 to the supporting surface or panel 24. The upper reciprocable electrode 42 is provided with a tip having a spherically convex surface 44 which is complementary to the surface 16 of the nut. The lower electrode 46 has a shoulder 48 on which rests the supporting plate 24, to support the plate 24 and the nut 10 during the time the welding pressure is applied by the upper electrode 42. A locating tip 50 enters the opening 26 in the plate 24 to axially align and properly position the plate for the welding operation.

In use, the nut 10 may be applied to a supporting structure such as panel 24 having an aperture 26 so that bore 12 is in alignment with aperture 26 and so that edge 18 engages panel 24, at which time edge 18 also constitutes the welding projection. The electrode 42 having a spherical contact surface 44 to match surfaces 16 may then be applied under pressure to the surface 16 on the end of nut 10 opposite to plate 24 and sufficient electrical current may be passed through the nut and plate assembly so that the edge 18 will melt and fuse with plate 24, as at 28.

It will be noted that the fused metal may flow inwardly as well as outwardly and yet not foul the passage formed by threaded bore 12 and aperture 26. It will also be observed that the electrode pressure will be relatively even at all points along the welding projection 18, despite possible non-parallelism between opposite edges 18, due to the self-centering characteristics of the spherical surface 16 when in contact with the spherical ended electrode 42. Since the nut is fused completely around its circumference, a fluid-tight joint is produced at 28. It will further be observed that the operation is the same no matter which of the edges 18 are in contact with panel 24.

The modified forms 32 and 34 of weld nut shown by Figures 4-6 are applied to panel 24 in the same manner as that shown by Figures 1-3. Nuts 32 and 34 differ in structure from nut 10 in that surfaces 36 are substituted for edges 18 and notches 38 or 40 are provided in outer peripheral wall 20.

Notches 38 or 40 may be provided in order to facilitate the boring and tapping of bore 12. It is evident that notches 38 or 40 also provide means for varying the dimensions of the welding projection surfaces 36 to suit the particular operating conditions, such as material thickness or machine capacity. Such notches may be similarly provided on nut 10 for the same reasons.

It will be noted that notches 38 and 40, as shown by Figure 4, are sufficiently shallow so that a continuous fluid-tight weld may still be obtained at 28.

From the foregoing specification and drawings it will be observed that there has been provided a weld assembly which eliminates the many objections above described of present day assemblies and which has additional novel features not found on weld assemblies presently used.

I claim:

1. A welding assembly comprising a cylindrical nut having an axial threaded bore for receiving a threaded fastener, said nut having the opposite ends thereof concavely formed from the outer peripheral edges thereof to said axial bore, a supporting panel having an opening therethrough and adapted to have said nut welded thereon in alignment with said opening, a first electrode having a shoulder thereon for receiving and retaining said supporting panel, a second electrode reciprocable with respect to said first electrode and axially aligned therewith, said second electrode having a tip formed convexly and complementary to said concave ends of said nut, one of said concave ends of said nut providing a continuous welding projection at the outer periphery thereof, and the other of said concave ends of said nut receiving said convex electrode tip when said tip is reciprocated to the welded position to weld said nut to said supporting panel.

2. The welding assembly set forth in claim 1 wherein said cylindrical nut has a groove in the outer peripheral wall thereof, said groove being of such depth so that a continuous fluid-tight weld is not interrupted thereby.

3. In combination, a supporting panel having an aperture therein and a cylindrical nut having a threaded axial bore and upper and lower welding electrodes, said nut having the ends thereof spherically inwardly formed from the outer peripheral edges thereof to said axial bore, either of said ends providing a continuous welding projection at the outer periphery thereof, said upper welding electrode having a spherical convex surface formed on the tip thereof and receivable in either of said ends of said nut to projection weld said nut to said supporting panel with a continuous fluid-tight connection.

4. The combination set forth in claim 3 wherein said cylindrical nut has a groove in the outer peripheral wall thereof, said groove being of such depth so that a continuous fluid-tight weld is not interrupted thereby.

5. In combination a supporting panel having an aperture therein, a cylindrical nut having a threaded axial bore, a stationary lower welding electrode adapted to support said supporting panel with said nut placed thereon, and a reciprocable upper electrode having a convex and spherically surfaced tip to engage said nut and weld said nut to said supporting panel, said nut having oppositely disposed concave and spherically surfaced ends complementary to said tip of said electrode, said ends being symmetrical and reversible and adapted to engage either the surface of said supporting panel or said tip of said electrode, said welding electrodes welding said nut to said supporting panel with a continuous fluid-tight connection.

6. The combination set forth in claim 5 wherein said cylindrical nut has a groove in the outer peripheral wall thereof, said groove being of such depth so that a continuous fluid-tight weld is not interrupted thereby.

References Cited in the file of this patent

UNITED STATES PATENTS

| Number | Name | Date |
|---|---|---|
| 1,064,699 | Berns | June 17, 1913 |
| 1,618,764 | Lunn | Feb. 22, 1927 |
| 2,014,090 | Schnetzer | Sept. 10, 1935 |
| 2,167,285 | Smith | July 25, 1939 |
| 2,213,630 | Gade | Sept. 3, 1940 |
| 2,270,835 | Hibert | Jan. 20, 1942 |
| 2,473,660 | Parmann | June 21, 1949 |
| 2,623,974 | Prucha | Dec. 30, 1952 |